Dec. 1, 1953   W. S. FLETCHER   2,661,115
KNOCKDOWN FUEL TANK

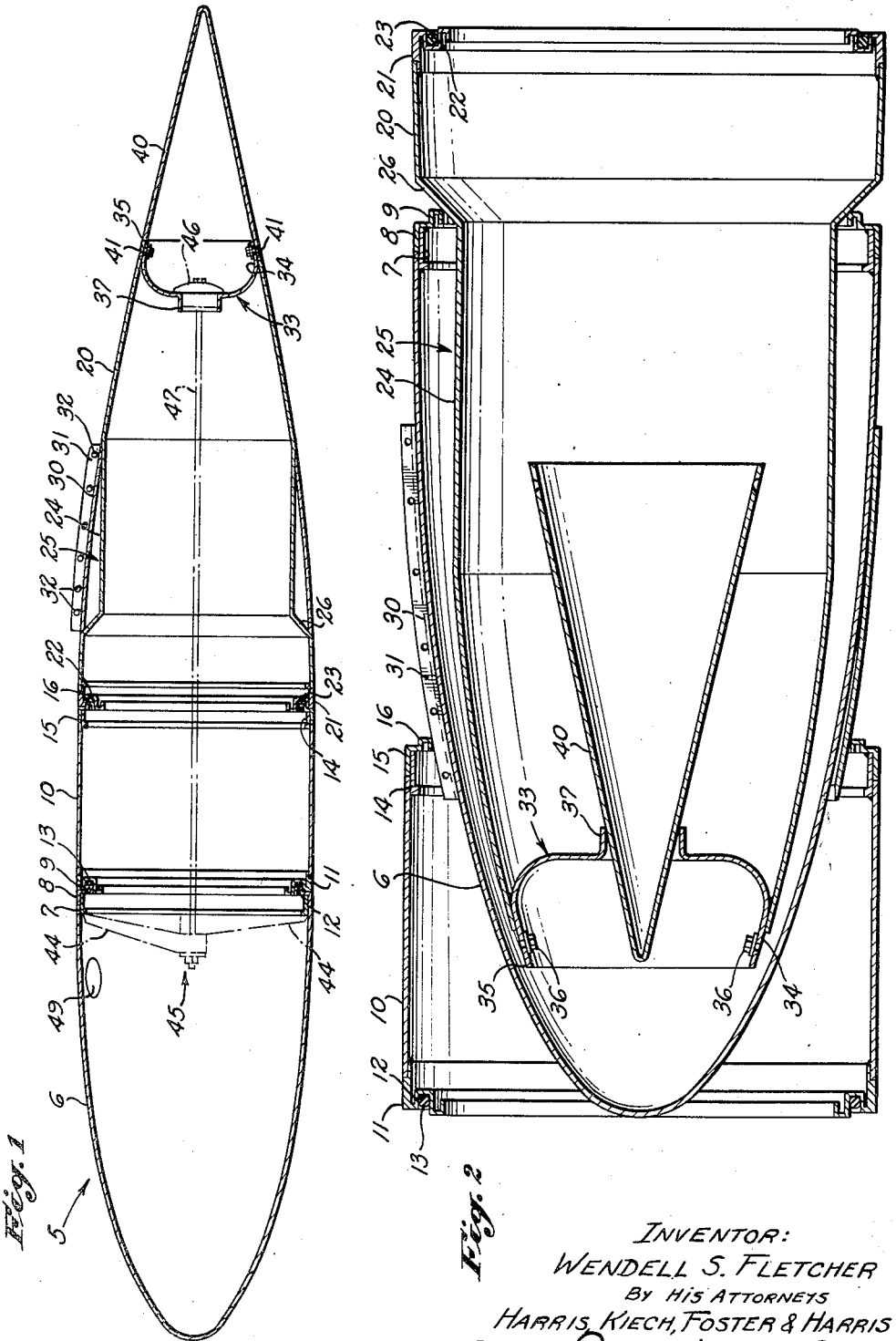

Filed July 10, 1950   2 Sheets-Sheet 2

INVENTOR:
WENDELL S. FLETCHER
BY HIS ATTORNEYS
HARRIS, KIECH, FOSTER & HARRIS

Patented Dec. 1, 1953

2,661,115

UNITED STATES PATENT OFFICE 2,661,115

KNOCKDOWN FUEL TANK

Wendell S. Fletcher, South Pasadena, Calif., assignor to Fletcher Aviation Corporation, Pasadena, Calif., a corporation of California Application July 10, 1950, Serial No. 172,960

9 Claims. (Cl. 220—5)

This invention relates generally to containers and more particularly to auxiliary fuel tanks for aircraft adapted for attachment to portions of the exterior of the aircraft, for example, the wing tips thereof.

It is common practice to construct auxiliary wing tip fuel tanks in two parts, that is, with an upper and a lower shell, each having a perimetrical bead which is welded to the bead of the other shell. The parts of the tank are made as stampings and assembled at the manufacturing plant. As will be apparent, such assembled tanks occupy considerable space during shipment to aircraft manufacturers and to airfields. In order to obviate this deficiency, efforts have been made to provide tanks which are composed of several components adapted to be readily assembled at the site where they are to be attached to the aircraft. Such tanks may include two or more coaxial parts which are joined at their circumferential seams by welding. In another multi-sectional tank, the several coaxial sections are joined in end-to-end relationship by axial clamping means, compressible sealing rings being interposed between the abutting ends to provide a leak-proof structure. Such a tank is disclosed in my pending application for patent on Auxiliary Tip Fuel Tank, Serial No. 63,822, filed December 6, 1948, and reference is made to this prior application for a detailed description of the means for clamping the several components together. In addition to being collapsible, the tank shown in the application referred to above is capable of being shipped in a knocked-down condition with its components in a somewhat nested condition, this being a desirable feature since all the parts of the tank can be shipped or stored as a unit in a single package. It has been found, however, that the size of the knocked-down structure can be further decreased so as to reduce still further the shipping or storage space required for the tank, when the components of the tank are specially designed with this objective in view.

It is therefore an important object of the present invention to provide an auxiliary wing tip fuel tank of the multi-sectional type in which the parts are so shaped and dimensioned that they are capable of being nested together within a very small compass.

Another object is to provide a tank, of the character referred to, in which the sections are adapted to be nested to form a shipping package, the length of which is considerably less than one-half the over-all length of the complete tank. A related object is to provide a multi-sectional tank which, when in knocked-down condition, has a space ratio of approximately 2:1, that is, two knocked-down tanks can occupy approximately the same shipping or storage space as one assembled tank. Since such auxiliary fuel tanks are used primarily on military airplanes and are shipped to the airfields for assembly and attachment to the airplanes, it is apparent that in the event of military conflict, the conserving of shipping space in railway cars, trucks, ships and transport aircraft is of utmost importance in meeting the supply requirements of the Air Force and that the present invention aids greatly in bringing about this desirable result.

I have determined that the maximum space ratio, discussed above, is best attained by making the tank in several sections, one or more of which have annular recesses or jogs in their peripheries to adapt these sections to be nested within other sections of the knocked-down tank, and this is also an important feature and object of the present invention. A related object is to provide fairing sections or bands adapted to be contracted in position surrounding the assembled tank in overlying relation to said annular recesses so as to maintain the streamlined contour which is of such vital importance in high-speed military airplanes.

Another object is to provide a knock-down fuel tank in which the adjoining ends of the various sections are sealed against leakage of fuel by compressible sealing rings, and in which the sections are so shaped and dimensioned that the sealing rings may be retained in annular sockets of the sections when the latter are in nested relationship so as to facilitate assembly of the tank at the airfield.

Further objects will appear from the following description and from the drawings, which are intended for the purpose of illustration only, and in which:

Fig. 1 is a longitudinal sectional view through one form of the improved knock-down auxiliary fuel tank;

Fig. 2 is an enlarged longitudinal sectional view, illustrating the manner in which the various sections and components of the tank shown in Fig. 1 can be stacked in nested relation to produce a knocked-down package unit suitable for shipping or storing the tank;

Figure 3:
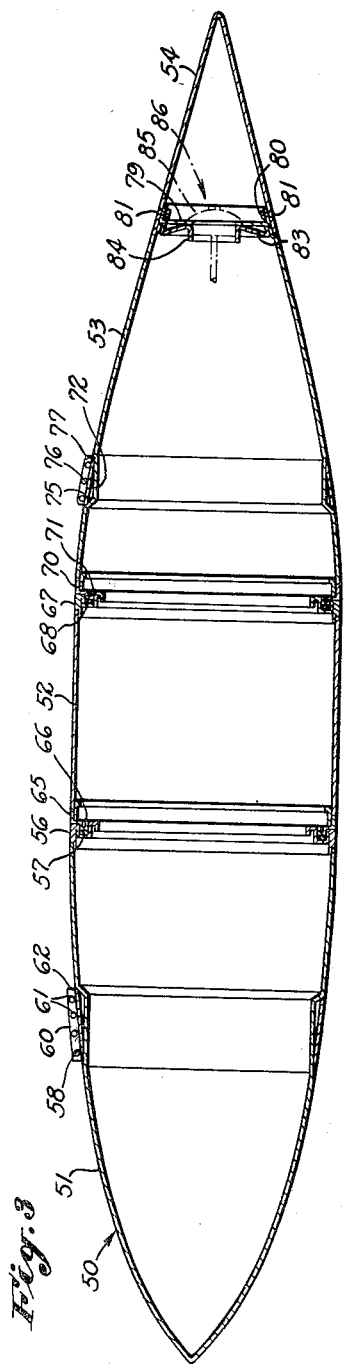
Fig. 3 is a view similar to Fig. 1, showing a knock-down auxiliary fuel tank of alternative construction.

Referring first to Figs. 1 and 2 of the drawings, the knock-down auxiliary fuel tank 5 is composed of several sheet-metal sections which are assembled in end-to-end relation to produce a tank which is streamlined, the tank being adapted to be detachably connected to the tip of an airplane wing. The tank 5 includes a forward tip or nose section 6 of conoidal shape having a reinforcing ring 7 within its rearward open end and an annular rim 8 surrounding the projecting end of the reinforcing ring, said rim 8 having an inwardly directed flange provided with an annular bead 9. The ring 7 and rim 8 may be suitably joined together and preferably they are welded to the rearward end of the nose section 6.

The tank 5 also includes an intermediate section 10 of tubular form. At its forward end, the section 10 carries a ring 11 which has an inwardly directed flange provided with an annular recess 12 in which is disposed a compressible sealing ring 13. At its rearward end, the section 10 has a reinforcing ring 14 and an annular rim member 15 having an annular bead 16.

The multi-sectional tank further includes a tail section 20 which is of generally frusto-conical shape. The forward portion of the section 20 has a reinforcing ring 21 provided with an inwardly directed flange which is formed with an annular recess or socket 22 in which is disposed a compressible sealing ring 23. Substantially midway between its ends, the tail section 20 is provided with an intermediate straight cylindrical portion 24 of lesser diameter than its forward portion, which intermediate portion forms, in effect, an annular recess or jog 25 in the otherwise smooth, frusto-conical contour. An annular shoulder 26 connects the cylindrical recessed portion 24 with the larger diameter forward portion of the tail section 20.

A frusto-conical fairing element or ring 30 is disposed in the annular recess or jog 25 and is of a contour which fairs into the streamlined contour of the tail section 20. The fairing element 30 is a sheet metal band having clamping strips 31 at its ends, clamping screws 32 being employed for drawing the strips toward each other so as to clamp the fairing element in place.

At its rearward or aft end, the tail section 20 has a bowl-shaped element 33 provided with a tapered circular side wall 34, this wall being welded to the interior of the rearward end of the tail section and projecting therefrom to provide an annular flange-like seat portion 35. A plurality of circumferentially spaced nuts 36 are carried by the seat portion 35. The element 33 is also provided with an axial tubular portion providing a bearing 37.

The tapered end portion of the section 20 preferably has a detachable tip 40. The forward open end of the tip 40 is provided with circumferentially spaced apertures, and screws 41 passing through these apertures and screwed into the nuts 36 serve to retain the tip connected to the body of the tail section 20.

It is thus seen that the several sections 6, 10, and 20 with the tip 40 are adapted to be connected in end-to-end relationship to provide an auxiliary fuel tank 5 of streamlined contour possessing excellent aerodynamic flow characteristics.

To assemble the tank 5, the radially extending clamping elements 44 of a clamping means 45 are first placed within the nose section 6 with their outer ends engaging the reinforcing ring 7. The intermediate section 10 is placed in axial alignment with the nose section 6 with the annular bead 9 entering the annular recess or socket 12 and resting against the sealing ring 13. The tail section 20 is next placed against the rearward end of the intermediate section 10, the annular bead 16 entering the annular recess 22 and being disposed against the sealing ring 23.

The sections 6, 10 and 20 are then secured together in coaxial relationship by the clamping means 45 which includes a cap 46 disposed in the bearing portion 37 of the element 33 and having a peripheral flange seated against the element. A clamping rod 47, in the form of a long bolt, passes through a central aperture in the cap 46 and has a head at one end abutting the rearward end of the cap. The other end of the rod 47 is provided with screw threads to adapt it to be screwed into a nut element carried by one of the clamping elements 44. Thus, by turning the rod 47, the several tank sections are drawn together and the sealing rings 13 and 23 are compressed between the adjoining sections to provide leak-proof joints. The clamping means 45 is herein shown in a simplified form and reference is made to my application referred to previously, for a more detailed description.

After the tank sections have been assembled in the manner explained above, the tail tip 40 is applied to the rearward end of the tail section 20 and fastened in place by means of the screws 41. The tank 5 is then ready for use and may be detachably connected to the tip of an airplane wing by any suitable means, not herein shown. The nose section 6 may be provided with a filler opening 49, and suitable fuel lines (not shown) may be connected to the intermediate section 10.

It is highly desirable that auxiliary wing tip fuel tanks be sent to the airfields in knocked-down condition so that they can be assembled as needed. Such a procedure results in a considerable saving in shipping and storage space. As will now be shown, by constructing the tank in accordance with the foregoing description, the various sections can be nested together in close relationship so as to conserve valuable shipping and storage space. By practicing the present invention, the space required for the knocked-down tank is reduced to a minimum so that a greater number of tanks may be contained in a given space.

Assuming that the various sections 6, 10, 20 and 30 and tip 40 are in disassembled or knocked-down relationship, these tank components are stacked or nested together as shown in Fig. 2 to provide a shipping unit or package of relatively small proportions. To effect this desirable result, the rearward end of the tail section 20 is first slid into the open rearward end of the nose section 6. It will be observed that the rearward end of the tail section 20 is adapted to be disposed adjacent the closed rounded end of the nose section. This desirable condition is made possible through the annular recess or jog 25 of the tail section 20 which allows the flanged end 9 of the nose section to pass over the periphery of the tail section. At this juncture, the bead 9 of the nose section 6 is disposed adjacent the tapered portion 26 of the tail section and within the flange element 27. The fairing band 30 is next slid onto the nose section 6 with its end of larger diameter engaging the periphery of the nose section. The intermediate tank section 10 is then slid over the rounded end of the nose section 6 with its bead 16 resting against the periphery of the frusto-conical fairing band 30. It is to be noted by reference to Fig. 2 that when the tank sections are thus nested together the forward end of the intermediate section, that is, the end containing the sealing ring 13, aligns with the rounded end of the nose section 6. The conical tail tip 40 may be placed within the tail section 20 with its apex disposed within the bearing portion 37 thereof, this operation being carried out either before or following the nesting of the tank sections 6, 10, 20 and 30. After the several tank components have thus been grouped together in nested relationship, the remaining elements, such as the clamping means 45, the cap 46, etc., may be placed in the tail section 20 through the open end thereof.

The nested group or package of tank components shown in Fig. 2 is particularly well adapted for shipping and storage since it occupies a relatively small space. By shaping and proportioning the various sections substantially as illustrated in Fig. 1, and nesting the same as shown in Fig. 2, the resulting knocked-down assembly or package occupies a space which is only a fraction of the space occupied by the assembled tank 5, the space ratio being 1:2.5. That is to say, approximately 2½ knocked-down groups such as that illustrated in Fig. 2 can be stored in the space required to store or transport one fully assembled tank 5. It is thus apparent that a material saving in space required for storing and shipping the auxiliary wing tip fuel tanks is achieved. As will be appreciated, such a conservation of space is extremely important from the military standpoint since the utilization of available space in ships, railway cars and transport aircraft to greatest advantage is of utmost importance in order to maintain an adequate supply of military supplies to the scene of conflict. In order to provide protection for the nested tank components, the latter may be enclosed in a suitable crate, carton or other rectangular container. Upon arrival of the container at its destination, the container may be opened and the tank sections may be removed and quickly assembled by following the procedure outlined previously.

Figure 4:
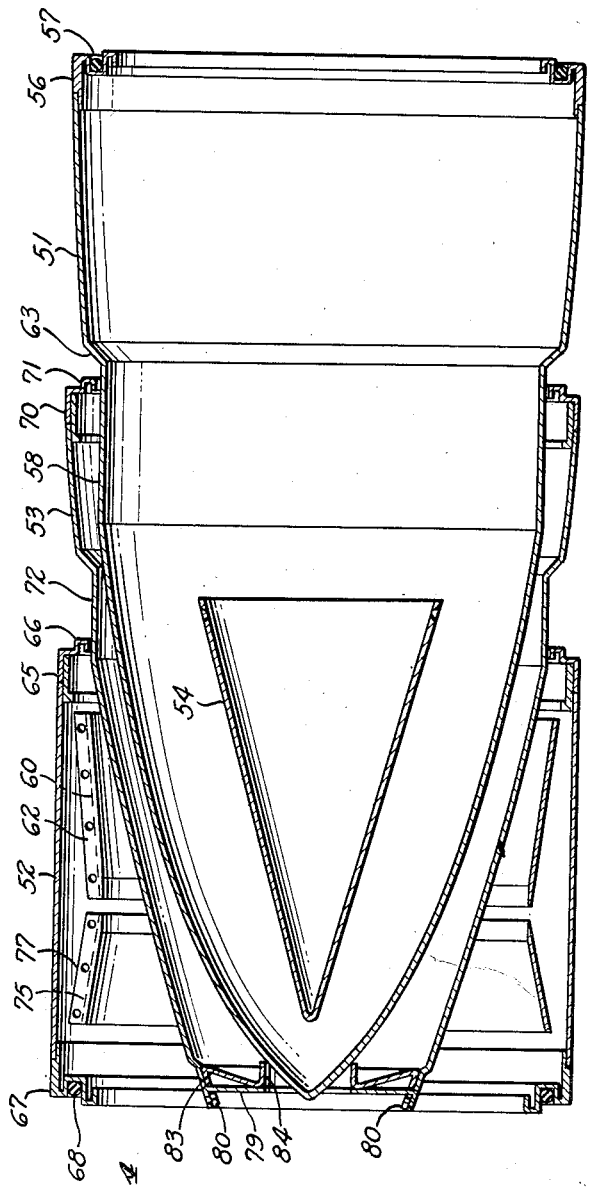
Fig. 4 is a view similar to Fig. 2, showing the components of the alternative tank in nested relationship.

Referring now to Figs. 3 and 4, the present invention contemplates the provision of an auxiliary wing tip fuel tank 50 of alternative construction, this tank also being of the multi-sectional knock-down type. The tank 50 includes a nose section 51, an intermediate section 52 and a tail section 53 having a detachable tip 54. In the first described form of the invention shown in Figs. 1 and 2, the tail section of the tank has an intermediate cylindrical portion of reduced diameter to facilitate nesting of the parts in the dismantled tank assembly. In this second form of the invention shown in Figs. 3 and 4, the nose section of the tank is likewise formed with an intermediate cylindrical portion of reduced diameter for the same purpose of facilitating nesting of the parts in the dismantled tank assembly.

The nose section 51 is of conoidal shape and has a flanged ring 56 at its rearward open end, the ring having an annular socket or recess in which is disposed a compressible sealing ring 57. Substantially midway between its ends the nose section has an intermediate cylindrical portion 58 forming an annular recess or step. A fairing band or split ring 60 of frusto-conical shape is normally disposed in said recess or step, being retained in place by screws 61 which pass through apertures in clamping strips 62 carried by the ends of the band.

The intermediate tank section 52 is cylindrical and has a flange element 65 at one end provided with an annular bead 66 which engages against the sealing ring 57 of the nose section 51 to compress the ring so as to effect a fluid-tight joint. At its rearward end, the intermediate section 52 has a flange element 67 which carries a compressible sealing ring 68.

The tail section 53 is of frusto-conical shape and has a flange element 70 at its forward, larger end portion, the element having an annular bead 71 which engages the ring 68 to compress the same so as to provide a fluid-tight joint. Adjacent its larger, forward end portion, the tail section 53 has an intermediate cylindrical portion 72 which is normally covered by a fairing band 75. Screws 76 passing through holes in clamping strips 77 provided at the ends of the band 75 retain the band in position overlying the cylindrical portion 72.

At its rearward, smaller end, the tail section 53 is reduced in diameter to receive the forward open end of the tail tip 54, which is of conical shape. An annular, flanged attaching element 79 is secured to the rearward end of the tail section 53 and is provided with nuts 80 for receiving screws 81 which pass through holes in the forward end of the tail tip 54 to retain the latter in place. A similar element 83 is fastened to the interior of the tail section 53, inwardly of the element 79 and has a tubular central portion 84 providing a bearing for receiving the cap 85 of the clamping means 86, the latter being similar to the clamping means 45, previously described.

In accordance with the present concept, the tank sections 51 to 53, tip 54, and associated parts 60, 75, 85, etc., are shipped to airfields in unassembled condition, the components being later assembled to produce the auxiliary fuel tanks as needed by the Air Force. As in the previously described tank 5, the various parts of the tank 50 are adapted to be packaged in nested relationship so as to conserve shipping and storage space. Referring to Fig. 4, the fairing bands 60 and 75 are first placed in the intermediate tank section 52, the ends of the rings being disconnected to allow contraction thereof so as to facilitate their insertion into the section 52. The smaller, rearward end of the tail section 53 is then slid into the intermediate section 52 with its intermediate cylindrical portion 72 sliding into the bead 66 thereof. The forward, pointed end of the nose section 51 is then slid into the tail section 53, it being noted that the diameter of the step portion 58 of the tail section is made slightly smaller than the inside diameter of the bead 71 to facilitate such nesting of the nose section within the tail section. The tail tip 54, the parts of the clamping means 86, etc., are then placed in the nose section 51 and the entire group of tank components may be crated in their knocked-down, nested relation for shipment or storage. The group or package of nested tank elements occupies only a fraction of the space required for a completely assembled fuel tank of the same shape and size as the tank 50. By providing the nose and tail sections with the annular depressions or cylindrical portions 58 and 72, the various components may be nested with considerably more compactness, it having been determined that slightly more than 2½ of the knocked-down packages can be shipped or stored in the space necessary to accommodate a single, fully assembled tank of the size and shape capable of being produced by the knocked-down components.

It will be apparent that the various tank sections may be nested by a procedure which differs in sequential steps from those exemplified herein, the particular steps being more or less selective or arbitrary. While the knock-down fuel tank has been herein disclosed as embodied in two specific forms, it is obvious that the shape and size of the improved tank may be varied in certain respects within the concept of this invention.

I claim as my invention:

1. A smoothly streamlined auxiliary wing-tip fuel tank of knock-down construction free from external peripheral projections comprising a plurality of tank sections joined together with girth parting lines, said tank sections having girth reinforcement members inside their peripheral walls positioned to lie on opposite sides of each parting line, said reinforcement members being adapted for sealing cooperation along the parting lines, said tank sections including an intermediate tank section and two end tank sections, each of said end tank sections being tapered at one of its ends and being dimensioned at the other end to match one end of said intermediate tank section, at least one of said end tank sections having an intermediate portion of reduced cross-section dimensioned to telescope into the girth reinforcement member at one end of said intermediate tank section whereby the dismantled tank sections may be nested together with said one end tank section nested in said intermediate tank section and the other end tank section nested in said one end tank section to form a compact dismantled tank assembly.

2. A combination as set forth in claim 1 in which said tank sections are circular in cross-section.

3. A combination as set forth in claim 2 in which said intermediate tank section is a cylinder of uniform diameter.

4. A combination as set forth in claim 1 in which one of said end tank sections has a tip detachable therefrom for stowage in said dismantled tank assembly.

5. A smoothly streamlined auxiliary wing-tip fuel tank of knock-down construction free from external peripheral projections comprising a plurality of tank sections joined together with girth parting lines, said tank sections having girth reinforcement members inside their peripheral walls positioned to lie on opposite sides of each parting line, said reinforcement members being adapted for sealing cooperation along the parting lines, said tank sections including an intermediate tank section and two end tank sections, each of said end tank sections being tapered at one of its ends and being dimensioned at the other end to match one end of said intermediate tank section, at least one of said end tank sections having an intermediate portion of uniform cross-section merging at one end with the tapered portion of the same end tank section and terminating at its other end in a girth shoulder stepping up the cross-sectional dimension of the same end tank section, said intermediate portion of the end tank section being dimensioned to telescope into the girth reinforcement member at one end of said intermediate tank section whereby the dismantled tank sections may be nested together with said one end tank section nested in said intermediate tank section and the other end tank section nested in said one end tank section to form a compact dismantled tank assembly.

6. A combination as set forth in claim 5 which includes a removable fairing ring to embrace said uniform intermediate portion of said one end tank section to provide a smooth transition from the tapered portion of the tank section to the stepped up cross-section of the same end tank section, said fairing ring being dimensioned for inclusion in said dismantled tank assembly.

7. A combination as set forth in claim 6 in which said tank sections are circular in cross-section and said intermediate tank section is a cylinder of uniform diameter throughout its length.

8. A combination as set forth in claim 7 in which one of said end tank sections has a tip detachable therefrom for stowage in said dismantled assembly.

9. A combination as set forth in claim 8 in which said one end tank section has a detachable tip and an internal circular seat to receive said tip in the dismantled tank assembly and for service in connecting said tank sections together to form a complete tank.

WENDELL S. FLETCHER.

References Cited in the file of this patent

UNITED STATES PATENTS

| Number | Name | Date |
|--------|------|------|
| 888,943 | Tuttle | May 26, 1908 |
| 1,183,928 | Webb | May 23, 1916 |
| 1,376,216 | Mittinger | Apr. 26, 1921 |
| 1,595,633 | Thwaits | Aug. 10, 1926 |
| 2,300,259 | Kueppers | Oct. 27, 1942 |
| 2,471,296 | Allen et al. | May 24, 1949 |
| 2,545,481 | Maier | Mar. 20, 1951 |